US005490025A

United States Patent [19]
Dorius et al.

[11] Patent Number: 5,490,025
[45] Date of Patent: Feb. 6, 1996

[54] AIR BEARING SLIDER WITH DEBRIS DEFLECTING FEATURES

[75] Inventors: Lee K. Dorius; Laurence S. Samuelson, both of San Jose, Calif.

[73] Assignee: International Business Machines Corporation, Armonk, N.Y.

[21] Appl. No.: 352,330

[22] Filed: Dec. 8, 1994

[51] Int. Cl.$^6$ .................................................. G11B 5/60
[52] U.S. Cl. ............................................................ 360/103
[58] Field of Search ....................................... 360/103, 102

[56] References Cited

U.S. PATENT DOCUMENTS

| | | | |
|---|---|---|---|
| 3,855,625 | 12/1974 | Garnier et al. | 360/103 |
| 4,212,044 | 7/1980 | Plotto | 360/103 |
| 4,218,715 | 8/1980 | Garnier | 360/103 |
| 4,225,891 | 9/1980 | Plotto | 360/103 |
| 5,021,906 | 6/1991 | Chang et al. | 360/103 |
| 5,128,822 | 7/1992 | Chapin et al. | 360/103 |
| 5,210,666 | 5/1993 | Chapin et al. | 360/103 |
| 5,267,104 | 11/1993 | Albrecht et al. | 360/97.02 |
| 5,317,465 | 5/1994 | Chapin et al. | 360/103 |

FOREIGN PATENT DOCUMENTS

| | | | |
|---|---|---|---|
| 60-13369 | 1/1985 | Japan | G11B 21/21 |
| 61-160885 | 7/1986 | Japan | G11B 21/21 |
| 62-110680 | 5/1987 | Japan | G11B 21/21 |
| 1-245480 | 9/1989 | Japan | G11B 21/21 |
| 4-228157 | 8/1992 | Japan | G11B 21/21 |

OTHER PUBLICATIONS

C. G. Keller et al., "Self–Cleaning Rigid Disk Head Design", IBM Technical Disclosure Bulletin, vol. 35, No. 7, Dec. 1992, pp. 14–15.

*Primary Examiner*—John H. Wolff
*Attorney, Agent, or Firm*—Ingrid M. Foerster

[57] ABSTRACT

The present invention is an air bearing design and methodology for use in a magnetic disk drive or similar device wherein particles of debris may be present on the recording surface. A deflecting wall is formed proximate to the leading edge of the slider, wherein airflow generated by the rotating disk enters the air bearing surface. The wall is disposed between the leading edge and one or more recessed regions defined by the ABS rail configuration. These recessed regions are ones that would otherwise be open to the incoming airflow and particles of debris. In a preferred embodiment, the wall is formed directly adjacent to the leading edge as an extension of rail portions located at the leading edge. The rail portions may include compression features. This design is suitable for both positive and negative pressure sliders. In an alternate embodiment, the deflecting wall stands alone and extends across substantially the slider's entire width. The deflecting wall is formed by modifying the shape of the recessed region(s) during slider fabrication so that a thin wall-like member remains near the leading edge after rail shaping.

14 Claims, 7 Drawing Sheets

AIR BEARING SLIDER WITH DEBRIS DEFLECTING FEATURES

FIELD OF THE INVENTION

The present invention relates generally to air bearing sliders for use in a disk drive. In particular, it relates to a method and apparatus for preventing debris particles from entering openings at a slider's leading edge with minimal impact on air flow to these openings.

BACKGROUND OF THE INVENTION

A magnetic storage device typically comprises one or more magnetic disks, each having at least one data recording surface including a plurality of concentric tracks of magnetically stored data, means such as a spindle motor for supporting and rotating the disk(s), at least one read/write transducer per recording surface for reading information from and writing information to the recording surface, an air bearing slider for supporting the transducer over the recording surface, and means such as an actuator/suspension assembly for selectively positioning the transducer and slider over a desired data track.

As is generally known in the art, airflow enters the slider's leading edge and flows in the direction of its trailing edge, generating a lifting force or "positive pressure" on the slider's air bearing surface (ABS), thereby supporting the slider at a nominal fly height over the recording surface.

As is also known in the art, numerous air bearing designs exist to achieve particular fly height characteristics. Many of these designs include air bearing designs that provide openings to the incoming airflow. A problem with such designs occurs when debris enters these openings and becomes trapped between the ABS and the recording surface. Particles may occur, for example, during the manufacture or assembly of the disk drive, from moving parts that wear over a period of time, a faulty air filtering system, or slider contact with disk asperities. If the particles are small, they will merely pass beneath the ABS unobstructed. However, larger particles of debris will be trapped, for example, by encountering obstructing features such as cross rails, or by becoming jammed between the slider and disk as the particles move toward the trailing edge, where slider-to-disk spacing decreases. As a result, the trapped debris can scratch the recording surface, and can damage the delicate transducer or interfere with its operation. It is therefore desirable to prevent large particles from passing between the ABS and recording surface by providing some means for diverting them away from the operating slider.

A number of design approaches have been taken to deal with surface debris. For example, U.S. Pat. No. 4,212,044 discloses a positive pressure slider with an air bearing surface comprising a pair of side rails and a plurality of shaped diverter blades at the trailing edge and parallel to the incoming airflow. The diverter blades force small particles of dust to either side, preventing the accumulation of dust along the trailing edge. However, this design will not prevent larger particles from passing beneath the ABS and becoming trapped at the trailing edge.

U.S. Pat. No. 5,210,666 discloses a negative pressure slider with a notch formed in its tapered cross-rail, functioning in part to minimize debris collection at the slider's leading edge. Rather than preventing particles from passing beneath the ABS, this design permits relatively small particles to pass under the ABS so that they do not accumulate at the leading edge. As is generally known in the art, a negative pressure slider design includes a region for generating a suction force to counteract and stabilize the positive pressure on the ABS.

Japanese application no. 4-228157 discloses a negative pressure slider having two T-shaped rails defining a negative pressure cavity with a shallow groove opening to the leading edge. The groove provides a channel for debris so that it does pass beneath the slider and therefore does not accumulate along the leading edge.

IBM Technical Disclosure Bulletin Vol. 35, No. 7, page 14, December 1992 discloses a slider for use in a rotary actuator disk drive, including a skewed rail for sweeping aside particles on the disk surface. This design is useful for pushing aside particles too large to pass beneath the slider ABS, but would not prevent all large particles from lodging between the slider and recording surface.

what is needed is a debris diverting means for an air bearing slider operating in contaminated disk drive environments, thereby avoiding damage to the slider, its transducer, and the recording surface of a magnetic disk drive by preventing large particles from passing under the slider's ABS to its trailing edge. Preferably, the diverter would not significantly affect the fly height characteristics of the slider, so that the same diverter could be used for a variety of ABS designs. Also needed is a relatively simple fabrication process for implementing diverting means on a slider.

SUMMARY OF THE INVENTION

It is therefore an object of the present invention to provide a debris deflector design methodology suitable for implementation on a variety of air bearing sliders, whereby large contaminants are prevented from entering large openings at the slider's leading edge and becoming trapped between the slider ABS and a recording surface.

Another object of the present invention is to provide a debris deflector design that does not adversely affect the fly height characteristics of the slider on which it is implemented.

A further object of the present invention is to provide a relatively simple process for forming a debris deflector during the fabrication of an air bearing slider.

Accordingly, the present invention is a debris deflector formed on an air bearing slider that includes at least one large "opening" to the airflow entering the slider's leading edge. The deflector is formed by a wall anterior to the opening with respect to the leading edge, and transverse to the incoming air flow. It extends toward the recording surface to a height determined by the size of particles to be deflected. The wall is preferably thin and does not support a significant positive load so that the air-bearing characteristics of the slider are not substantially affected. In the preferred embodiment, the wall includes a gap large enough to permit passage of the airflow, but too narrow to permit particles from passing through into the slider opening. The gap further assures that the fly height characteristics of the slider are not adversely affected by the presence of a deflecting wall.

BRIEF DESCRIPTION OF THE DRAWING

The foregoing and other objects, features and advantages of the present invention will be apparent from the following detailed description of the preferred embodiments of the invention, reference being made to the accompanying drawings, wherein like reference numerals indicate like components and in which:

FIGS. 7 (a)–(d) are bottom plan views of other positive and negative pressure air bearing sliders embodying the present invention.

DESCRIPTION OF THE PREFERRED EMBODIMENT

Figure 1:
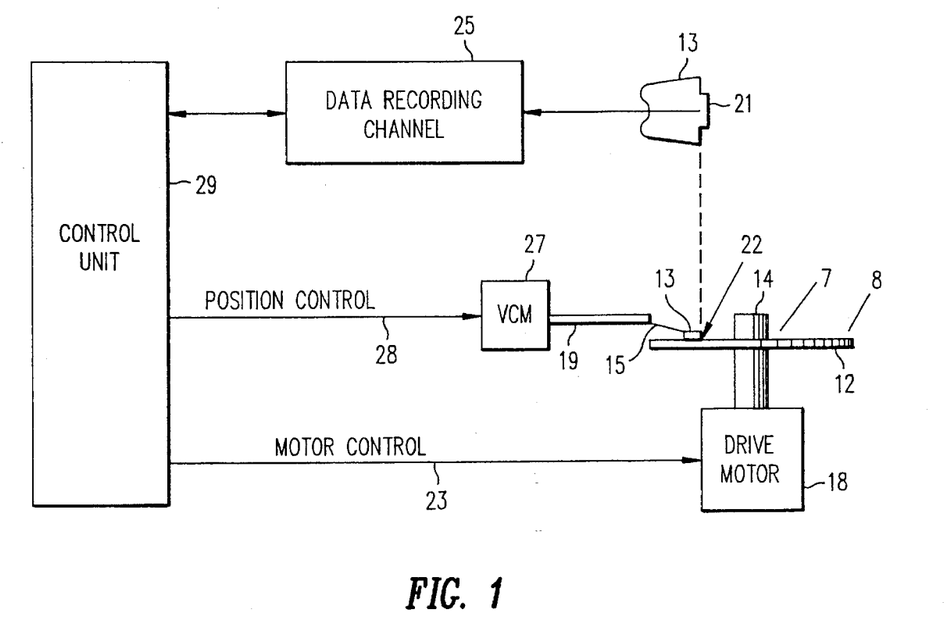
FIG. 1 is a schematic diagram of a magnetic disk storage system useful for practicing the present invention.

Referring now to FIG. 1, a magnetic disk storage system comprises at least one rotatable magnetic disk 12 supported on a spindle 14 and rotated by a disk drive motor 18 with at least one slider 13 positioned on the disk 12, each slider 13 supporting one or more magnetic read/write transducers 21, commonly referred to in the art as read/write heads.

The magnetic recording media on each disk is in the form of an annular pattern of concentric data tracks (not shown) on disk 12. As the disks 12 rotate, the sliders 13 are moved radially or along an arcuate path over the disk surface 22 so that the heads 21 may access different portions of the disk where desired data is recorded.

Each slider 13 is attached on its upper surface to an actuator arm 19 by means of a suspension 15. The suspension 15 provides a slight spring force which biases the slider 13 against the disk surface 22. Each actuator arm 19 is attached to an actuator means 27. The actuator means as shown in FIG. 1 may be a voice coil motor (VCM), for example. The VCM comprises a coil moveable within a fixed magnetic field, the direction and velocity of the coil movements being controlled by the motor current signals supplied by a controller.

During operation of the disk storage system, the rotation of the disk 12 generates an air bearing between the slider 13 and the disk surface 22 which exerts an upward force or positive pressure on the lower surface of the slider. This lower or air bearing surface (ABS) typically includes a plurality of air bearing rails shaped to provide desired flying characteristics. The positive pressure generated on these rails counterbalances the slight spring force of the suspension 15 and supports the slider 13 off and slightly above the disk surface by a small, substantially constant spacing during operation.

The various components of the disk storage system are controlled in operation by control signals generated by control unit 29, such as access control signals and internal clock signals. Typically, the control unit 29 comprises logic control circuits, storage means and a microprocessor, for example. The control unit 29 generates control signals to control various system operations such as drive motor control signals on line 23 and head position and seek control signals on line 28. The control signals on line 28 provide the desired current profiles to optimally move and position a selected slider 13 to the desired data track on the associated disk 12. Read and write signals are communicated to and from read/write heads 21 by means of recording channel 25.

The above description of a typical magnetic disk storage system, and the accompanying illustration of FIG. 1 are for representation purposes only. It should be apparent that disk storage systems may contain a large number of disks and actuators, and each actuator may support a number of sliders.

Figure 2A:
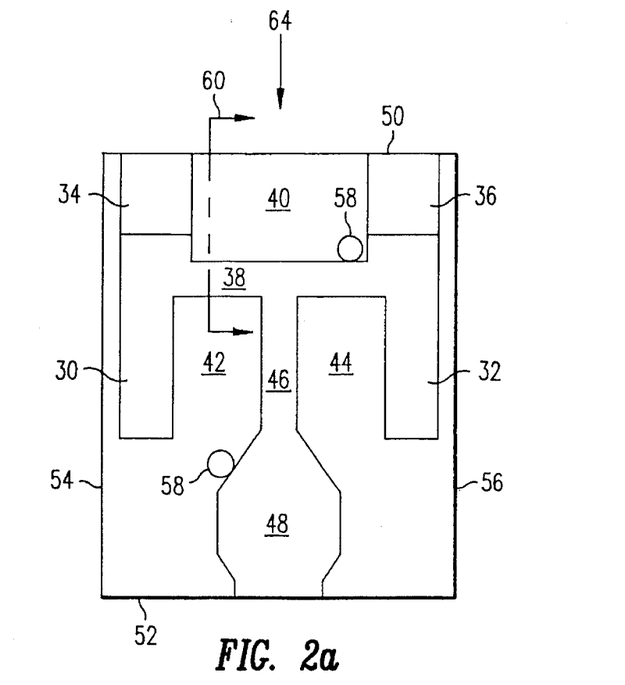
FIG. 2(a) a bottom plan view of a negative pressure air bearing slider with leading edge tapers useful for practicing the present invention.
Figure 2B:
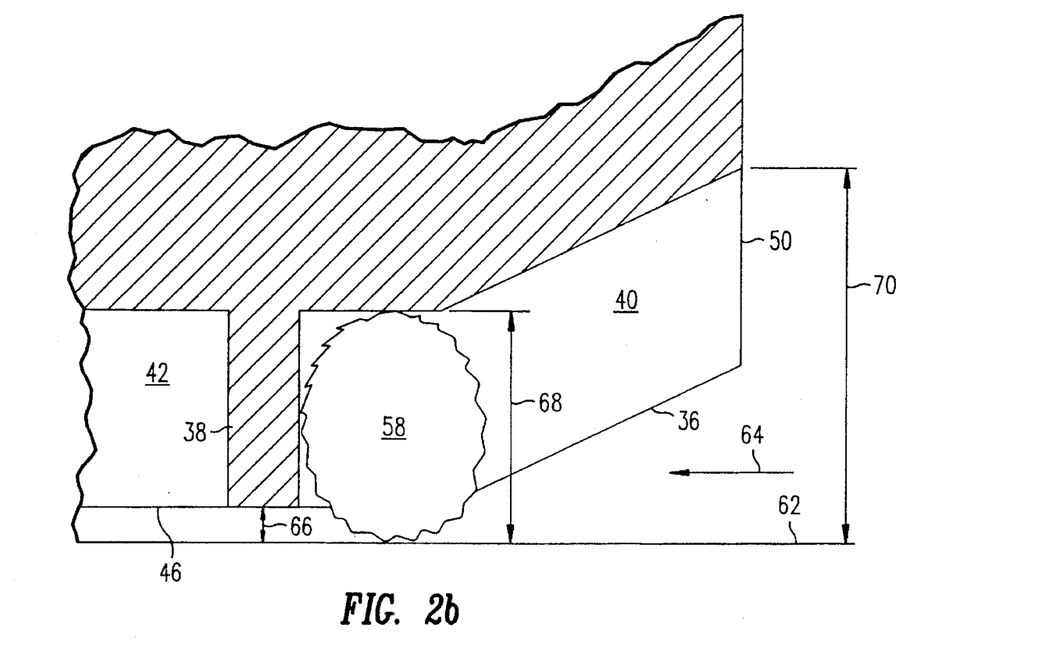
FIG. 2(b) is an enlarged cross-sectional side view of the negative pressure slider of FIG. 2(a) encountering debris.
Figure 5A:
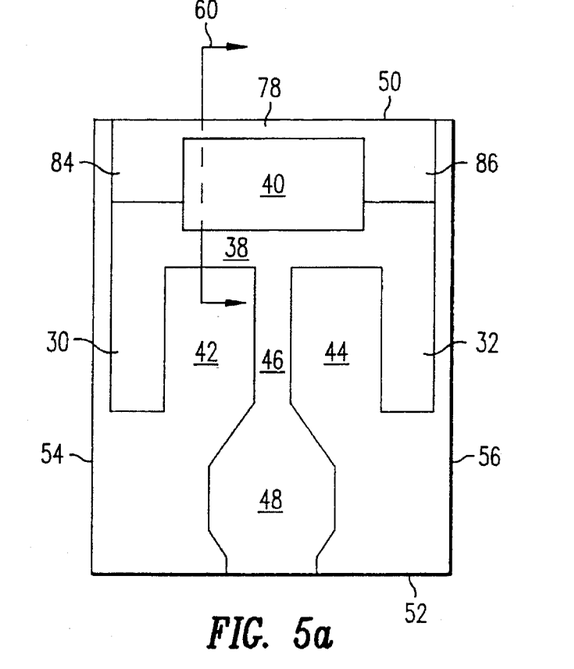
FIG. 5(a) is a bottom plan view of a negative pressure slider with steps rather than tapers at the leading edge embodying the present invention.
Figure 5B:
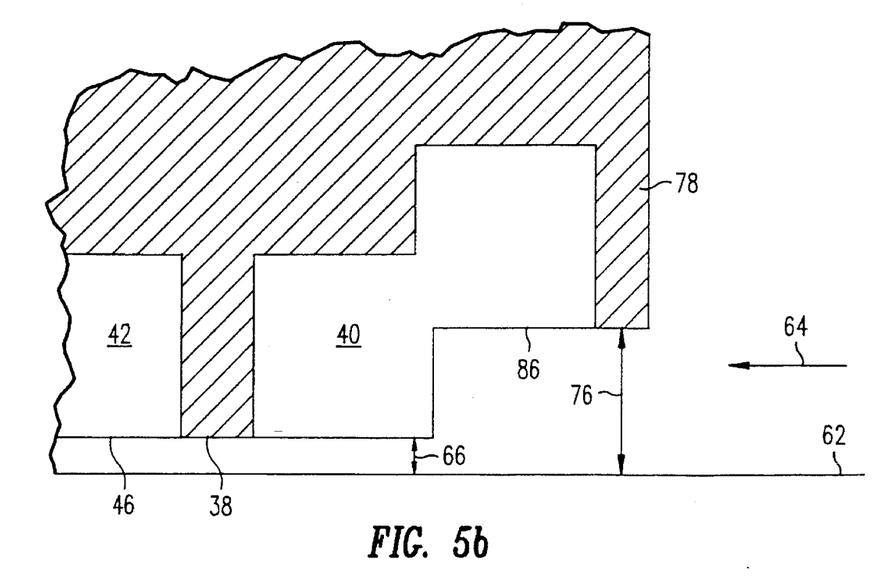
FIG. 5(b) is a cross-sectional side view of the negative pressure slider of FIG. 5(a)

FIG. 2(a) shows the air bearing surface (ABS) of a negative pressure slider which has been used with magnetic storage systems such as the system of FIG. 1. It includes a pair of shortened side rails 30,32 having compression features 34,36. As is generally known in the art of slider design, compression features 34,36 provide improved lift-off performance. The compression features may be tapered, as shown in FIG. 2(b), stepped, as shown in FIG. 5(b) or have an equivalent design. The air bearing surface further includes a leading edge pocket 40 and two negative pressure regions 42,44. The leading edge pocket 40 is defined by side rails 30,32 and cross rail 38. The negative pressure regions 42,44 are further defined by center rail 46 including island 48 which typically supports a transducer (not shown). When subjected to an incoming airflow, the negative pressure regions form a suctionlike force to counteract the positive pressure generated on the ABS rails. The counteracting force creates a more constant fly height as the slider moves across the disk and is exposed to differing disk velocities. The leading edge pocket allows some airflow into the negative pressure regions in order to reduce the effects of negative pressure at high disk velocities.

The slider is preferably a nanoslider, measuring about 2050 microns from leading to trailing edge and 1600 microns from side edge to side edge. The length of side rails 30,32 is preferably 1230 microns, and their widths are 260 microns and 230 microns, respectively. Leading edge tapers 34,36 extend 320 microns from the leading edge. Opening 40 is preferably 800 microns wide and 430 microns from leading edge to cross rail 38. Center rail 46 measures about 1450 microns in length, with a minimum width of 200 microns, a maximum width of 530 microns, and a width along the trailing edge 52 of 380 microns.

Leading edge pocket 40 and negative pressure pockets 42,44 are formed according to known fabrication processes, such as photolithography, reactive ion etching (RIE), laser ablation, chemical etching, or other appropriate means. Tapered portions 34,36 are formed first along the leading edge 50, and the pocket or opening 40 is formed thereafter. Consequently, a portion of opening 40 mirrors the slant of the compression features 34,36, as shown in FIG. 2(b), thus providing an opening at the leading edge 50 having a maximum slider to disk spacing 70 of about 10 microns and a minimum spacing 68 of about 5 microns. It will be understood that all measurements are for illustration purposes, and that the present invention may be applied to sliders of both smaller and larger dimensions, as well as to sliders having different rail configurations.

In an operational disk drive, air flow into the slider ABS is in the direction of arrow 64, entering the leading edge 50 and continuing toward the trailing edge 52. First and second side edges 54,56 are shown for later reference. The negative pressure slider of FIG. 2(a) is susceptible to debris accumulation in the leading edge pocket, which provides a large opening to the incoming air at leading edge 50 and obstructs particles at cross rail 38. It may also be susceptible to the accumulation of smaller particles at island 48, which includes edges that may obstruct the moving debris.

FIG. 2(b) shows a cross section of the negative pressure slider of FIG. 2(a), taken along dotted line 60. The slider is shown suspended in close proximity to a recording surface 62. For example, the slider to disk spacing 66 may be 500 nm. A particle of debris 58 moving with the moving recording surface 62 has entered the opening 40 at leading edge 50 and become trapped at cross rail 38, as shown.

Figure 3A:
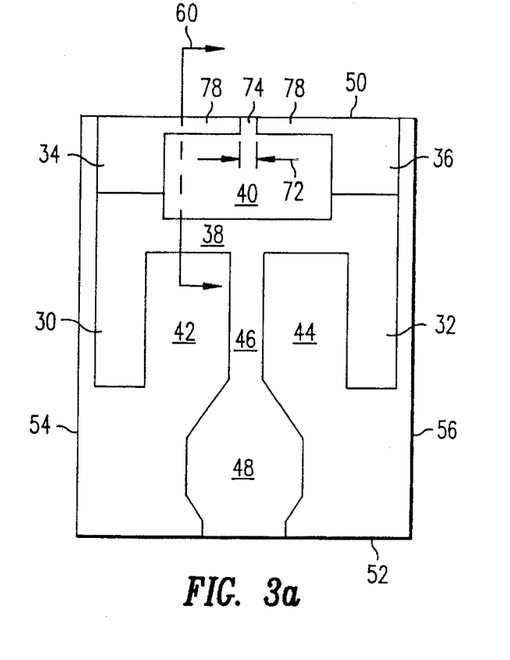
FIG. 3(a) is a bottom plan view of a negative pressure slider with tapers embodying the present invention.
Figure 3B:
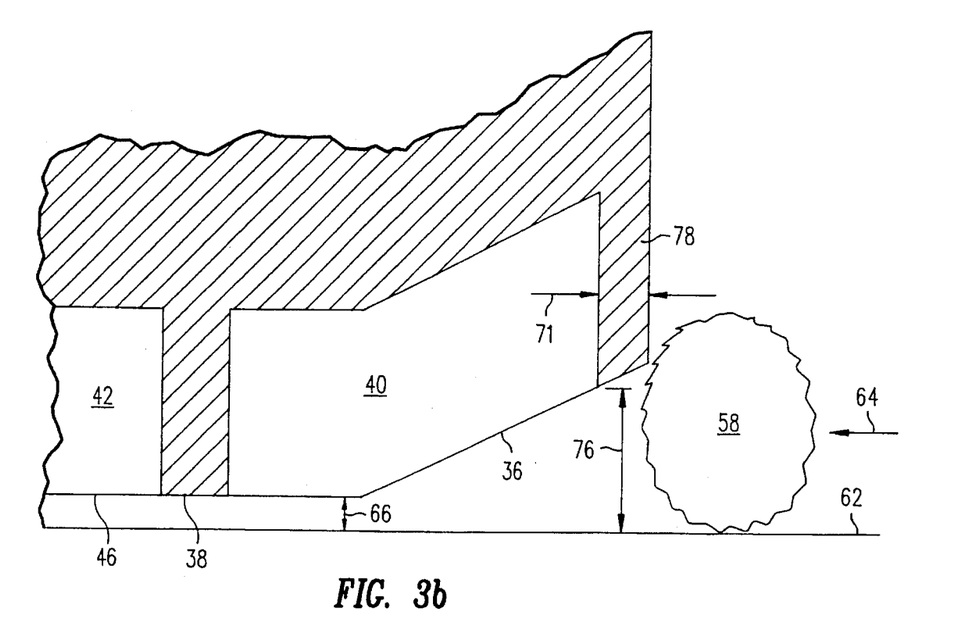
FIG. 3(b) is an enlarged cross-sectional side view of the negative pressure slider of FIG. 3(a) encountering debris.

According to the preferred embodiment of the present invention, the inflow of particles at opening 40 is reduced by adding debris deflecting walls 78 to the slider of FIG. 2(a) proximate to its leading edge 50, as shown in FIGS. 3(a) and 3(b). Debris deflecting walls 78 are formed by reducing the size of the leading edge pocket or opening 40 during fabrication so that it no longer extends to the leading edge 50. The reduction in size effectively extends tapered portions 34,36 along the leading edge 50. It will be understood, however, that the deflecting walls 78 may alternatively be set back from the leading edge anterior to the opening and still provide the desired effect. The walls are preferably very thin so that they are effectively non-air bearing and thus do not significantly affect slider performance. For example, in the embodiment shown, width 71 measures approximately 100 microns. The preferred embodiment includes a narrow air gap 74 formed between walls 78 and having a width 72 on the order of 100 microns. This gap permits additional airflow into leading edge pocket 40, assuring that slider performance is not adversely impacted.

As shown in FIG. 3(b), debris deflectors 78 extend the leading edge portion of the slider toward recording surface 62 thereby decreasing the slider-to-disk spacing 76; for example, to 3.2 microns. Thus, particles having diameters greater than 3.2 microns are prevented from entering the opening 40 and becoming trapped beneath the ABS, where damage to the recording surface 62 can occur.

Figures 4A, 4B, 4C:
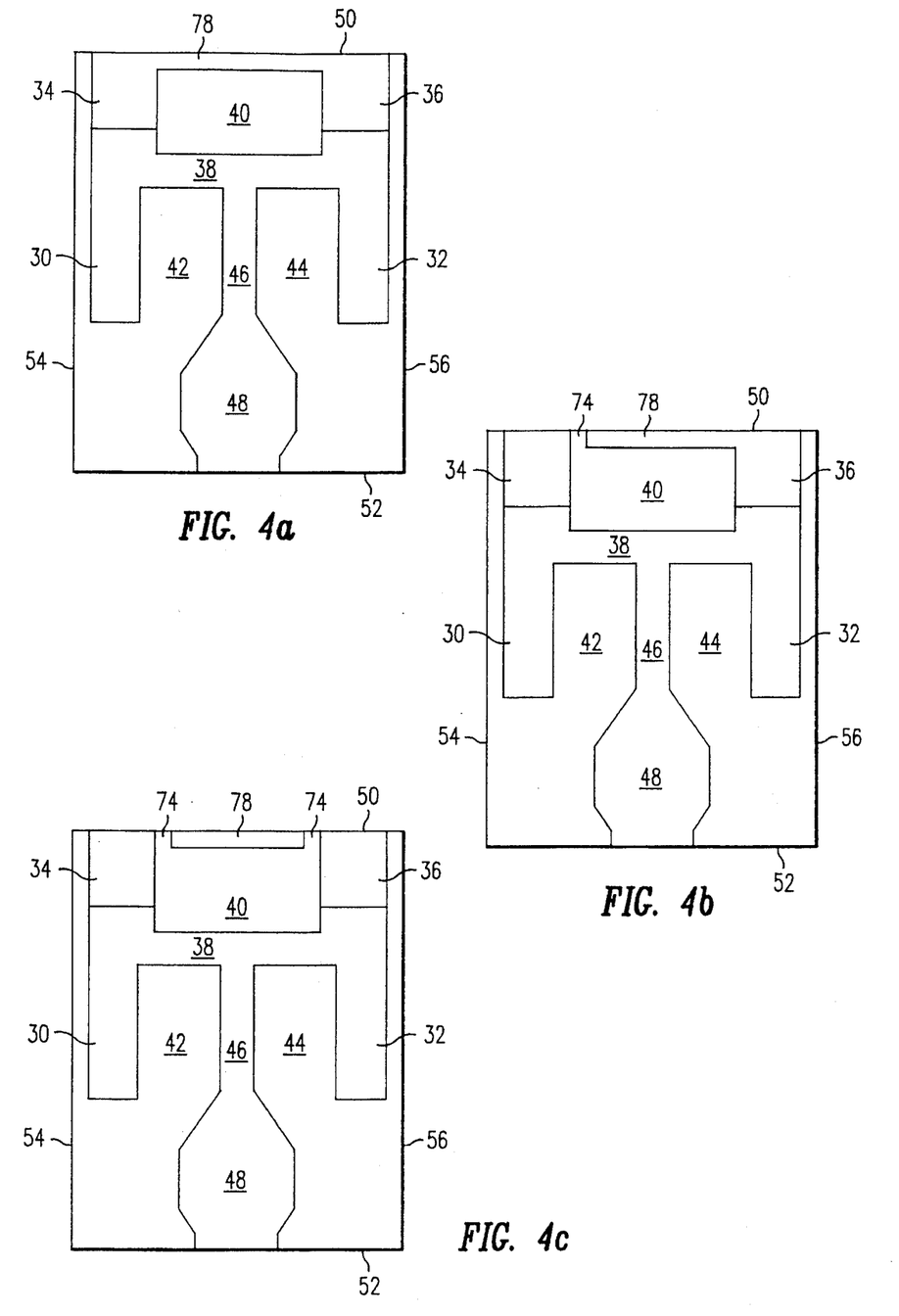
FIGS. 4(a)–(c) are bottom plan views of a negative pressure air bearing slider including alternative embodiments of the present invention.

FIGS. 4(a), 4(b) and 4(c) show a negative pressure slider having a rail configuration of FIG. 2(a) and including alternative embodiments of debris deflectors 78. In FIG. 4(a), the deflecting wall 78 extends across the entire leading edge from compression feature 34 to compression feature 36. No air flow gap is provided. This embodiment would be suitable, for example, in a slider where the beveled portions 36,38 are cut at a greater slope than shown in FIG. 3(b). In such designs, air flow into leading edge pocket 40 would not be hindered significantly by deflecting wall 78. FIG. 4(b) shows a deflecting wall 78 with an offset gap 74. This design may be desirable for highly skewed environments, such as rotary actuator disk drives, or merely as an alternative to a centrally located gap. When greater air flow into leading edge pocket 40 is desirable, the embodiment of FIG. 4(c) is preferred wherein deflecting wall 78 includes dual air gaps 74.

As mentioned previously, compression features along rails 30,32 may be formed by steps rather than tapers. This design alternative is illustrated in FIGS. 5(a) and 5(b). Again the stepped portions 84,86 are generally formed first; for example, by ion milling, reactive ion etching, chemical etching, photolithography, or other known and appropriate methods. Leading edge pocket 40 is formed thereafter, again using generally known methods. Deflecting wall 78 is formed by reducing the shape of the leading edge pocket 40 during the fabrication process.

The deflecting wall design according to the present invention may be implemented with or without air gaps on a wide variety of air bearing slider designs. For example, FIGS. 6(a) through 6(d) show a well-known positive pressure slider design having a pair of side rails 90,92 including optional compression features 94,96, which may be beveled, stepped or otherwise formed to provide an equivalent effect.

Figure 6A:
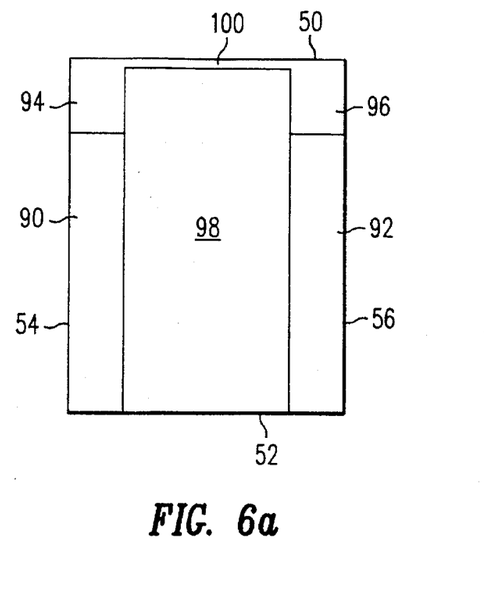
FIGS. 6(a)–(d) are bottom plan views of a positive pressure slider embodying the present invention.
Figure 6B:
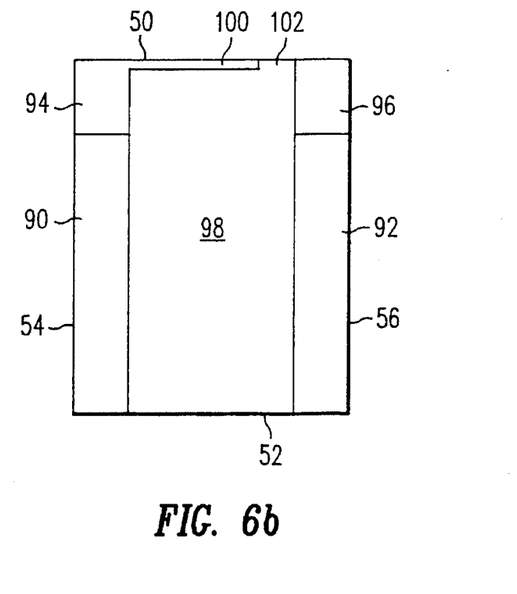
Figure 6C:
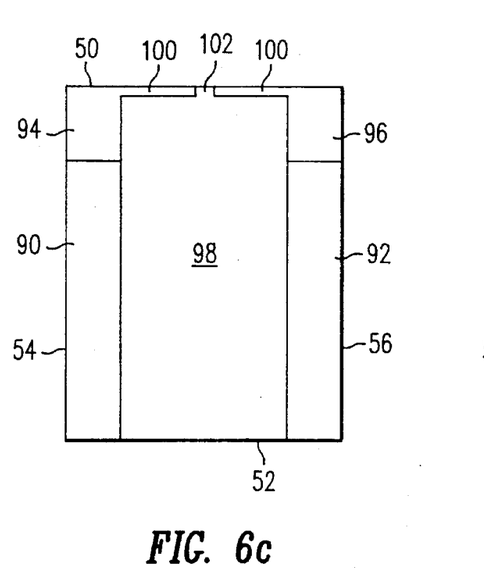
Figure 6D:
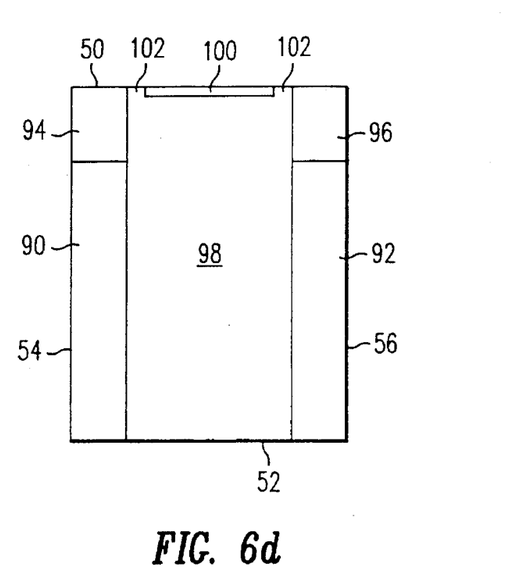

In FIG. 6(a), deflecting wall 100 extends from beveled portions 94,96 along the leading edge 50. Deflecting wall 100 prevents large particles from entering what would otherwise be an open space 98 to the incoming air flow, and becoming trapped at the trailing edge 52. (Recall that the trailing edge 52 of most sliders tends to fly closer to the disk surface than the leading edge 50.) FIG. 6(b) again shows the positive pressure slider, this time with a deflecting wall 100 including an offset air gap 102. FIG. 6(c) shows a deflecting wall 100 with a centrally located air gap 102 and FIG. 6(d) provides dual air gaps 102 between deflecting wall 100 and compression features 94,96 for additional air flow into opening 98. It will be apparent that each of these deflecting wall configurations may be set back slightly from the leading edge 50 of the sliders without impacting their function.

Figure 7A:
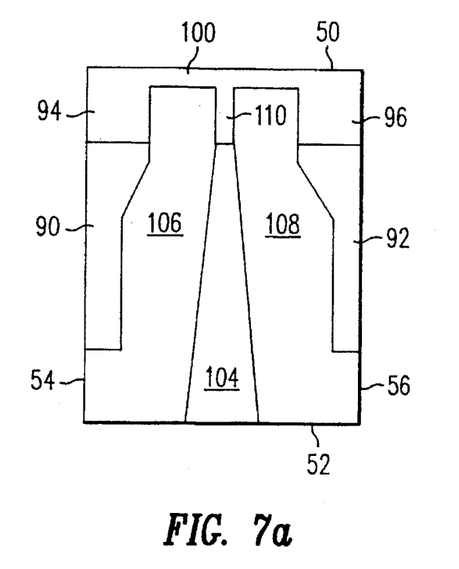

Additional examples of slider configurations which may benefit from the deflecting means of the present invention are shown in FIGS. 7(a) through 7(d). FIG. 7(a) shows a well-known tri-rail slider design including first and second side rails 90,92 proximate to side edges 54,56, respectively, and a center rail 104 extending from the leading edge 50 to trailing edge 52. The side rails 90,92 include compression features 94,96 which may be tapered, stepped or otherwise formed. Center rail 104 also includes a compression feature 110. Deflecting wall 100 is formed along leading edge 50 anterior to openings 106,108 by slightly reducing the length of these recessed areas during the fabrication process.

Figure 7B:
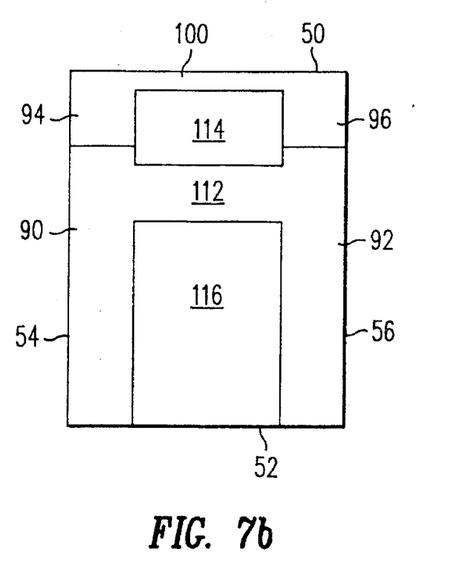

The slider shown in FIG. 7(b) is an H-rail configuration including a leading edge pocket 114 and one negative pressure pocket 116. These pockets are defined by side rails 90,92 which include compression features 94,96, and by a cross rail 112. The compression features 94,96 have been extended to form deflector wall 100. Debris deflector wall 100 is formed by reducing the shape of the leading edge pocket 114 during the fabrication process to only partially remove the region between rails 90,92 and cross rail 112.

It should be apparent to those of ordinary skill in the art based upon the preceding disclosure that the deflector wall 100 of the sliders in FIGS. 7(a) and 7(b) may additionally include one or more gaps to permit greater air to flow into openings 106,108 and 114 when desirable. It should further be understood that deflector wall 100 in these slider configurations may be set back from leading edge 50 in the direction of trailing edge 52. Such positioning would further reduce the slider-to-disk spacing at the deflecting wall.

Figure 7C:
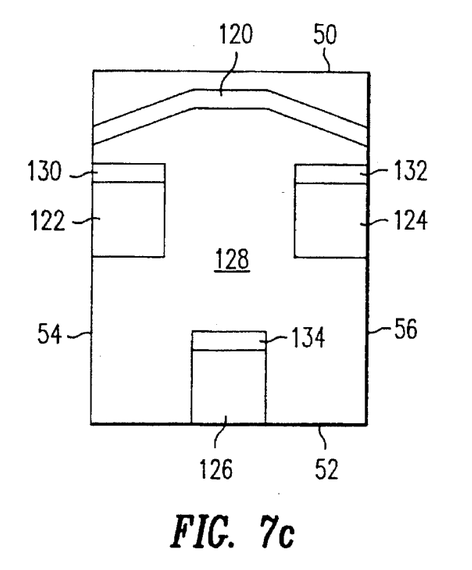

FIG. 7(c) shows a known positive pressure tri-pad slider design having an air bearing surface which deviates somewhat from traditional rail configurations. The tri-pad design is desirable, for example, in pico sliders having much smaller dimensions than nanosliders. The air bearing surfaces or pads 122,124,126 are built up from the slider's lower surface or formed by removing a large portion of the surface according to known fabrication methods. Remaining would be a large opening 128 to the leading edge 50 of the slider. For this design, a modified debris deflecting wall 120 stands independently from the rails. IT is disposed proximate to the leading edge 50 and extends transversely from the first to the second side edges. The wall 120 is formed by conventional rail shaping techniques as previously discussed. For example, photoresists may be applied to the regions of the slider's lower surface that will become pads 122,124,126 and wall 120. Etching means such as a chemical etch may then be used to remove portions of the slider surrounding the photoresist and upon completion of the etching step the photoresists are removed.

The design of FIG. 7(c) is prone to particle accumulation along the edges of each pad facing the leading edge 50, and at the low-flying trailing edge 52. Debris deflecting wall 120 therefore prevents relatively large particles from entering the region between the air bearing surfaces and the disk surface. Pads 122,124,126 are shown with compression features 130,132,134, which may be tapered or stepped.

Figure 7D:
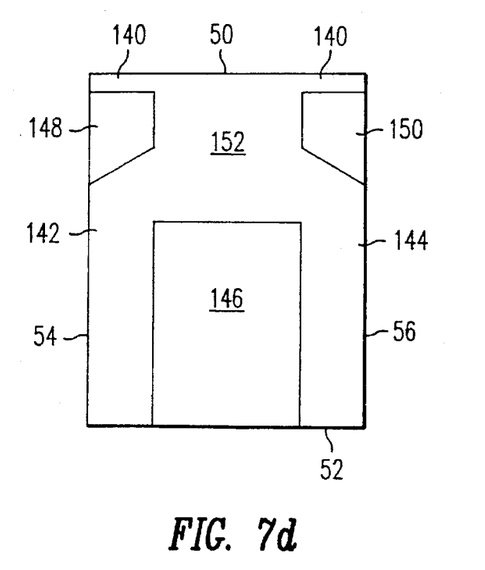

The slider shown in FIG. 7(d) has a negative pressure air bearing surface including a negative pressure pocket 146 formed by side rails 142,144 and a cross rail 152 including an extension to the leading edge 50. Areas 148,150 to either side of extended cross rail 152 are protected from particle accumulation by deflecting walls 140. The deflecting walls 140 are formed by reducing the shapes of openings 148,150 during the fabrication process, effectively extending the cross-rail along the leading edge 50.

It will be understood that deflecting wall 120 of FIG. 7(c) and deflecting walls 140 of FIG. 7(d) may further include air gaps to permit increased air flow into openings 128, 148 and 150. In addition, wall 120 of FIG. 7(c) may be formed directly adjacent to the leading edge 50, and walls 140 of FIG. 7(d) may be set back from the leading edge 50. All of the exemplary sliders shown in the present application are made according to known fabrication processes and the modifications required to form the deflecting walls should be readily apparent to those of ordinary skill in the art of slider fabrication. The slider configurations shown are for illustration purposes only. It will be understood that the present invention may easily be adapted to most, if not all, air bearing sliders regardless of the size, shape, and rail configuration of the slider.

Although the present invention has been described with reference to specific embodiments, it will be understood that many modifications and adaptations of the described embodiments may occur to one skilled in the art without departing from the scope of the present invention as set forth in the following claims.

We claim:

1. An air bearing slider for use in a disk drive, comprising:
   a slider body, comprising a leading edge, a trailing edge, an upper surface, and a lower surface;
   an air bearing surface formed on said lower surface by a plurality of rails, wherein said plurality of rails defines a recessed area proximate to said leading edge; and
   a substantially non-airbearing deflecting wall of predetermined height disposed on said lower surface between said recessed area and said leading edge for preventing particles of debris of predetermined size or larger from entering said recessed area, wherein said height of said deflecting wall is determined by said predetermined size.

2. The air bearing slider of claim 1, wherein said plurality of rails forms a negative pressure region on said lower surface.

3. The air bearing slider of claim 1, wherein said deflecting wall is disposed directly adjacent to said leading edge.

4. The air bearing slider of claim 1, wherein said deflecting wall further comprises at least one gap formed therein.

5. The air bearing slider of claim 1, wherein said plurality of rails further comprises first and second side rails, and wherein said deflecting wall extends transversely from said first side rail to said second side rail.

6. The air bearing slider of claim 1, wherein said plurality of rails further comprises first and second side rails, and a center rail disposed therebetween that extends from said leading edge in the direction of said trailing edge, wherein said plurality of rails defines first and second recessed areas proximate to said leading edge, and wherein said deflecting wall extends transversely from said first side rail to said center rail, and from said center rail to said second side rail.

7. The air bearing slider of claim 1, wherein said plurality of rails further comprises first and second side rails, and a cross rail extending therebetween, wherein said plurality of rails defines a leading edge pocket anterior to said cross rail and a negative pressure region posterior to said cross rail with respect to said leading edge, and wherein said deflecting wall extends transversely from said first side rail to said second side rail between said leading edge and said leading edge pocket.

8. The air bearing slider of claim 1, wherein said plurality of rails further comprises first and second side rails, a cross rail extending therebetween, and a center rail extending from said cross rail toward said trailing edge, wherein said plurality of rails defines a leading edge pocket anterior to said cross rail and first and second negative pressure regions posterior to said cross rail with respect to said leading edge, and wherein said deflecting wall extends transversely from said first side rail to said second side rail between said leading edge and said leading edge pocket.

9. The air bearing slider of claim 1, wherein said slider body further comprises first and second side edges, wherein said plurality of rails further comprises a first pad proximate to said first side edge, a second pad proximate to said second side edge, and a third pad proximate to said trailing edge, and wherein said deflecting wall is disposed between said leading edge and said first and second pads and extends transversely from said first side edge to said second side edge.

10. The air bearing slider of claim 1, wherein said slider body further comprises first and second side edges, wherein said plurality of rails further comprises a cross rail disposed posterior to said leading edge and extending from said first side edge to said second side edge, a center rail extending from said cross rail toward said leading edge, and first and second side rails extending from said cross rail in the direction of said trailing edge, thereby defining a negative pressure region posterior to said cross rail with respect to said leading edge, and wherein said deflecting wall comprises two portions extending from said center rail to respective ones of said first and second side edges.

11. The air bearing slider of claim 1, wherein said plurality of rails further comprise at least one compression feature formed directly adjacent to said leading edge.

12. The air bearing slider of claim 11, wherein said at least one compression feature comprises a taper formed at said leading edge.

13. The air bearing slider of claim 11, wherein said at least one compression feature comprises a step formed at said leading edge.

14. A disk drive, comprising:
- a disk having a recording surface for storing information thereupon;
- means for rotating said disk;
- an air bearing slider, comprising,
  - a slider body, including a leading edge, a trailing edge, first and second side edges, an upper surface, and a lower surface,
  - an air bearing surface formed on said lower surface by a plurality of rails, wherein said plurality of rails defines a recessed area proximate to said leading edge, and
  - a substantially non-airbearing deflecting wall of predetermined height disposed on said lower surface between said recessed area and said leading edge for preventing particles of debris of predetermined size or larger from entering said recessed area, wherein said height of said deflecting wall is determined by said predetermined size;
- a transducer formed on said slider and adapted for reading information from and writing information to said recording surface; and
- means for suspending and selectively positioning said transducer in close proximity to said rotating disk.

* * * * *